United States Patent
Endo

(10) Patent No.: US 10,122,039 B2
(45) Date of Patent: Nov. 6, 2018

(54) METHOD OF PRODUCING DISPERSION LIQUID OF GELATINOUS ELECTROLYTE

(71) Applicant: TOYOTA JIDOSHA KABUSHIKI KAISHA, Toyota-shi, Aichi-ken (JP)

(72) Inventor: Yoshito Endo, Aichi-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 405 days.

(21) Appl. No.: 14/934,716

(22) Filed: Nov. 6, 2015

(65) Prior Publication Data

US 2016/0133978 A1    May 12, 2016

(30) Foreign Application Priority Data

Nov. 10, 2014  (JP) ................................ 2014-227960

(51) Int. Cl.
| | | |
|---|---|---|
| *H01M 8/00* | (2016.01) | |
| *H01M 8/1016* | (2016.01) | |
| *H01M 8/1081* | (2016.01) | |
| H01M 8/1023 | (2016.01) | |
| H01M 8/1039 | (2016.01) | |
| H01B 1/12 | (2006.01) | |

(52) U.S. Cl.
CPC ....... *H01M 8/1016* (2013.01); *H01M 8/1081* (2013.01); *H01B 1/122* (2013.01); *H01M 8/1023* (2013.01); *H01M 8/1039* (2013.01); *H01M 2300/0085* (2013.01); *Y02P 70/56* (2015.11)

(58) Field of Classification Search
CPC ............. H01M 8/1016; H01M 8/1081; H01M 8/1023; H01M 8/1039; H01M 2300/0085
See application file for complete search history.

(56) References Cited

U.S. PATENT DOCUMENTS

| | | |
|---|---|---|
| 2005/0142411 A1 | 6/2005 | Aihara |
| 2013/0045864 A1 | 2/2013 | Kato |
| 2014/0205932 A1 | 7/2014 | Hori et al. |

FOREIGN PATENT DOCUMENTS

| | | | |
|---|---|---|---|
| JP | 2005-174587 | 6/2005 | |
| JP | 2010-129409 | 6/2010 | |
| JP | 2011-140605 | 7/2011 | |
| JP | 5525629 B2 | 6/2014 | |
| JP | 5565305 B2 | 8/2014 | |
| WO | WO 2011/083842 A1 | 7/2011 | |
| WO | WO 2013/031060 A1 | 3/2013 | |
| WO | WO-2014028894 A1 * | 2/2014 | .......... H01M 8/1034 |

OTHER PUBLICATIONS

K. Nakamura, "What Kind of Condition is a Gel", Chemistry and Biology, vol. 36, No. 1, pp. 61-65 (1998).

A.Y. Nosaka et al., "Persistent Change in the Behavior of Water in a Perfluorinated Ionomer after Heating," Macromolecules, 2006, vol. 39, pp. 4425-4427 (2006).

A.Y. Nosaka et al., "Estimation of Water Contents of Polymer Electrolytes from $^1$H NMR Peak of Confined Water," The 216th ECS Meeting, Abstract No. 958, The Electrochemical Society.

* cited by examiner

*Primary Examiner* — Nicholas P D'Aniello

(74) *Attorney, Agent, or Firm* — Finnegan, Henderson, Farabow, Garrett & Dunner, LLP

(57) ABSTRACT

A method of producing a dispersion liquid of a gelatinous electrolyte includes a water content reduction process of concentrating an aqueous dispersion liquid of an electrolyte at a temperature of 50° C. or less and reducing a water content in a concentrate of the electrolyte to 5% by mass or less based on the total mass of the concentrate of the electrolyte, and an alcohol addition process of adding an alcohol to the concentrate of the electrolyte obtained in the water content reduction process to form the dispersion liquid of the gelatinous electrolyte.

10 Claims, No Drawings

METHOD OF PRODUCING DISPERSION LIQUID OF GELATINOUS ELECTROLYTE

INCORPORATION BY REFERENCE

The disclosure of Japanese Patent Application No. 2014-227960 filed on Nov. 10, 2014 including the specification, drawings and abstract is incorporated herein by reference in its entirety.

BACKGROUND OF THE INVENTION

1. Field of the Invention

The invention relates to a method of producing a dispersion liquid of a gelatinous electrolyte.

2. Description of Related Art

A fuel cell is a power generation system which obtains electric power by electrochemically reacting hydrogen and oxygen. In principle, the only product generated with power generation is water. Thus, the fuel cell draws attention as a clean power generation system which gives little load to the global environment. Depending on the kind of electrolytes, the fuel cell is classified into a solid polymer type, a phosphoric acid type, a molten carbonate type and a solid oxide type.

The solid polymer type fuel cell uses a proton-conductive ion-exchangeable solid polymer electrolyte membrane as an electrolyte. A membrane electrode assembly (MEA), which is a basic unit of the solid polymer type fuel cell, has a structure in which two sets of electrode catalyst layers are bonded to an upper surface and a lower surface of an ion-exchangeable solid polymer electrolyte membrane. In the case where the electrolyte used as a material of the ion-exchangeable solid polymer electrolyte membrane is a dispersion liquid of a gelatinous electrolyte, it is possible to manufacture the membrane electrode assembly without having to use an auxiliary material for bonding the electrode catalyst layers. For that reason, the gelatinous electrolyte is useful in manufacturing the solid polymer type fuel cell.

Japanese Patent Application Publication No. 2005-174587 (JP 2005-174587 A) discloses a gel electrolyte which is formed by mixing an acid and a polymer compound swelling against the acid. JP 2005-174587 A describes that the polymer compound is partially-methylated polybenzimidazole in which at least a part of substituents R of a specific polybenzimidazole structure is composed of a methyl group.

PCT International Publication No. WO 2013/031060 discloses a method of producing a catalyst ink used in forming a catalyst electrode, which includes a process of generating a catalyst dispersion liquid by dispersing catalyst-supporting particles, which are catalyst-supporting conductive particles, in a solvent, a process of preparing a gel body by mixing an ionomer and a volatile solvent, and a process of preparing a catalyst ink by stirring and mixing the catalyst dispersion liquid and the gel body. The ionomer is an ion-conductive polymer which is also used as a material of an electrolyte membrane. PCT International Publication No. WO 2013/031060 describes that perfluorosulfonic acid polymer such as Nafion (registered trademark) or the like may be used as the ionomer. Furthermore, PCT International Publication No. WO 2013/031060 describes that the ionomer used in the process of preparing the gel body by mixing the ionomer and the volatile solvent may preferably have an ion exchange equivalent weight (EW) value of 500 to 900 g/mol, the weight ratio of alcohol in a mixed solution may preferably be 5 to 20% by weight, and the heating temperature may preferably be in a range of 60 to 90° C.

Japanese Patent Application Publication No. 2010-129409 (JP 2010-129409 A) discloses a fuel cell including an electromotive part provided with a membrane electrode assembly which includes a fuel electrode, an air electrode and an electrolyte membrane sandwiched between the fuel electrode and the air electrode so as to make contact with a catalyst layer of the fuel electrode and a catalyst layer of the air electrode, wherein a gas diffusion layer of the fuel electrode includes a conductive porous base material filled with hydrophilic conductive particles having hydrophilicity. JP 2010-129409 A describes that the electrolyte membrane is composed of a proton-conductive material. Furthermore, JP 2010-129409 A describes that, since it is important that the water supplied from the air electrode through the electrolyte membrane is held by the fuel electrode, the respective members including the electrolyte membrane is hydrophilized by an acid treatment or the like.

PCT International Publication No. WO 2011/083842 discloses a method of producing a polymer electrolyte solution, which includes a pre-solution preparation process of preparing a pre-solution in which a polymer electrolyte having a side chain with a hydrophilic functional group is dissolved in a solvent, and a solution preparation process of obtaining a polymer electrolyte solution from the pre-solution by reducing at least water to a concentration of 10% or less. PCT International Publication No. WO 2011/083842 describes that the removal of water may be performed in a water bath. Furthermore, PCT International Publication No. WO 2011/083842 describes that at least one of a secondary alcohol and a tertiary alcohol may be used as the solvent.

As described above, different means have been developed with a view to providing a gelatinous electrolyte used in manufacturing a solid polymer type fuel cell. However, in the techniques of, e.g., JP 2005-174587 A and PCT International Publication No. WO 2013/031060, a problem exists in that the electrolyte to be gelled is limited to an electrolyte having a specific structure and/or a specific physical property (e.g., an EW value). Furthermore, in the technique of PCT International Publication No. WO 2011/083842, the viscosity can be increased. However, a problem exists in that the gelation may not sufficiently proceed.

SUMMARY OF THE INVENTION

The invention provides means for easily and stably gelling different electrolytes.

As a result of various investigations on the means for solving the above problems, the inventors have found that an electrolyte may be stably gelled by concentrating an aqueous dispersion liquid of the electrolyte at a low temperature, reducing a water content in a concentrate of the electrolyte, and then adding an alcohol. The inventors have completed the invention on the basis of the above finding.

That is to say, the gist of the invention is as follows.

(1) A producing method of producing a dispersion liquid of a gelatinous electrolyte, including: a water content reduction process of concentrating an aqueous dispersion liquid of an electrolyte at a temperature of 50° C. or less and reducing a water content in a concentrate of the electrolyte to 5% by mass or less based on the total mass of the concentrate of the electrolyte; and an alcohol addition process of adding an alcohol to the concentrate of the electrolyte obtained in the water content reduction process and forming the dispersion liquid of the gelatinous electrolyte.

(2) The producing method according to item (1), wherein in the water content reduction process, the aqueous dispersion liquid of the electrolyte is concentrated until an electrolyte content in the concentrate of the electrolyte becomes 20% by mass or more based on the total mass of the concentrate of the electrolyte.

(3) The producing method according to items (1) or (2), wherein in the water content reduction process, the aqueous dispersion liquid of the electrolyte is concentrated at a temperature which falls within a range of 0 to 30° C.

(4) The producing method according to any one of items (1) to (3), wherein the alcohol is one or more aliphatic alcohols.

According to the invention, it is possible to provide means for easily and stably gelling different electrolytes.

Other problems, configurations and effects will become apparent from the following descriptions of embodiments.

DETAILED DESCRIPTION OF EMBODIMENTS

A preferred embodiment of the invention will now be described in detail.

<1: Method of Producing a Dispersion Liquid of a Gelatinous Electrolyte>

The invention relates to a method of producing a dispersion liquid of a gelatinous electrolyte. In the subject specification, the term "gel", "gelatinous" or "gel state" means that a solution or a dispersion liquid containing a polymeric material and having liquid fluidity (hereinafter also referred to as "sol") loses the liquid fluidity and, consequently, (i) becomes a cohesive dispersion system which contains two or more components including at least a polymeric material and a medium, (ii) shows a mechanical behavior having a solid feature, and (iii) comes into a state in which the polymeric material and the medium continuously spread over the entirety thereof. This definition is well-known in the relevant technical field (see, e.g., Kunio Nakamura, "What kind of condition is a gel", Chemistry and Biology, Vol. 36, No. 1, 1998).

In the subject specification, the term "dispersion liquid of a gelatinous electrolyte" refers to an electrolyte dispersion liquid which, as a result of the electrolyte in the dispersion liquid being changed into a gel shape (hereinafter also referred to as "gelled"), stably maintains a gel state that satisfies all the requirements (i) to (iii). In general, if a dispersion liquid of an electrolyte is thermally treated at a high temperature, there may be a case where the dispersion liquid becomes a cohesive dispersion system and the viscosity thereof increases. Even in this case, if the dispersion liquid of the electrolyte does not show a mechanical behavior having a solid feature and/or if the dispersion liquid of the electrolyte does not come into a state in which an electrolyte and a medium continuously spread over the entirety thereof, it is not determined that the electrolyte is in a gel state. In the case where the electrolyte is not in a gel state, there is a possibility that, when the electrolyte is applied to a material of an electrode catalyst layer and/or an electrolyte membrane used in a membrane electrode assembly of a solid polymer type fuel cell, cracks are generated during the course of drying the member. Furthermore, in the case where the electrolyte is not in a gel state, it becomes difficult to adjust the viscosity of the dispersion liquid of the electrolyte. Thus, there is a possibility that uneven distribution of a material and wind ripple or dripping are generated when the electrolyte is applied to a material of an electrode catalyst layer and/or an electrolyte membrane. In this case, there is a possibility that the quality degradation of the resultant solid polymer type fuel cell occurs. For that reason, by producing a dispersion liquid of a gelatinous electrolyte that satisfies all the requirements (i) to (iii), it is possible to provide a material for manufacturing a high-quality solid polymer type fuel cell.

Whether the dispersion liquid of the electrolyte is in a gel state may be determined by confirming the satisfaction of all the requirements (i) to (iii), for example, by visual observation or based on a physical test. For example, if it is confirmed by naked eyes or microscopic observation, etc., that the dispersion liquid of the electrolyte is a cohesive dispersion system and that the dispersion liquid of the electrolyte is in a state in which an electrolyte and a medium continuously spread over the entirety thereof, it is evaluated that the requirements (i) and (iii) are satisfied. Furthermore, if the dispersion liquid of the electrolyte is pinched by a spatula or the like and can be held in a pinched state, it is evaluated that the requirement (ii) is satisfied. Alternatively, if it can be confirmed based on the measurement results of physical properties of the dispersion liquid of the electrolyte, such as dielectric constant, a viscosity or a viscoelasticity, that $G''/G'=1$ in an exponential law represented by $G^*(\omega)=G(i\omega/\omega_0)^n$, $\tan(n\pi/2)=G''/G'$ (where $0<n<1$ and where n denotes an exponent), it may be evaluated that the requirement (ii) is satisfied (see, e.g., Kunio Nakamura, "What kind of condition is a gel", Chemistry and Biology, Vol. 36, No. 1, 1998, p. 63).

The method of the invention is required to include a water content reduction process and an alcohol addition process. The respective processes of the method of the invention will now be described in detail.

[1-1: Preparation Process]

The method of the invention may optionally include a preparation process which prepares an aqueous dispersion liquid of an electrolyte.

The method of the invention may be applied to different electrolytes used as a material of a solid polymer electrolyte membrane in a membrane electrode assembly of a fuel cell. Thus, the electrolyte prepared in this process is not particularly limited as long as the electrolyte is a polymer having a structure in which an ion exchange group is coupled to a polymer base material. The method of the invention may be applied to different solid polymer electrolytes such as, for example, a fluorocarbon-based material having a structure in which a perfluorosulfonic acid group is coupled to a resin base material, a hydrocarbon-based material having a structure in which a sulfonic acid group is coupled to a hydrocarbon-based resin base material, or an inorganic-element-based material having a structure in which an inorganic-element-containing ion exchange group such as a tungstic acid, a phosphotungstic acid or the like is coupled to a base material. Examples of the electrolyte prepared in this process may include, but are not limited to, commercially available electrolytes such as Nafion (registered trademark) of DE2021CS type (manufactured by Wako Pure Chemical Industries, Ltd.), Nafion (registered trademark) of DE1021CS type (manufactured by Wako Pure Chemical Industries, Ltd.), Flemion (registered trademark) (Asahi Glass Co., Ltd.) and Aciplex (trademark) (manufactured by Asahi Glass Co., Ltd.), and electrolytes such as a high-oxygen-permeability electrolyte disclosed in Japanese Patent Application Publication No. 2011-140605 (JP 2011-140605 A) and the like.

In this process, the dispersion liquid of the electrolyte may be prepared by preparing the electrolyte based on the means well-known in the relevant technical field and/or with reference to the documents cited above. Alternatively, the dispersion liquid of the electrolyte may be prepared by purchasing a pre-prepared electrolyte or an aqueous dispersion liquid of an electrolyte. Either case is included in the embodiment of this process.

[1-2: Water Content Reduction Process]

This process is a process of concentrating an aqueous dispersion liquid of an electrolyte at a predetermined temperature. By virtue of this process, it is possible to reduce the water content in a concentrate of an electrolyte obtained by the concentration to a predetermined value. The aqueous dispersion liquid of the electrolyte used in this process may be prepared according to the aforementioned preparation process.

In the related art, there is known a method in which, with a view to gelling an aqueous dispersion liquid of an electrolyte, water is removed by heating and concentrating the aqueous dispersion liquid of the electrolyte at a high temperature (e.g., about 100° C.) (see, e.g., PCT International Publication No. WO 2011/083842). However, if an aqueous dispersion liquid of a polymeric material capable of being gelled is heated at a high temperature, there may be a case where the polymeric material is crystallized while carrying water molecules therein (see, e.g., Nosaka, A. Y. et al., Macromolecules, 2006, Vol. 39, p. 4425-4427; and Nosaka, A. Y. et al., the $216^{th}$ ECS Meeting, Abstract #958, The Electrochemical Society). If such a phenomenon occurs, the water molecules carried into the polymeric material are stabilized. Even when the temperature is reduced, it is impossible to remove the water molecules from the polymeric material. For that reason, there is a possibility that the resultant product does not come into a gel state which satisfies the aforementioned requirements.

The inventors have found that, if an aqueous dispersion liquid of an electrolyte is concentrated at a low temperature, it is possible to substantially suppress the crystallization of an electrolyte carrying water molecules therein and to greatly reduce the water content. Furthermore, the inventors have found that a dispersion liquid of a gelatinous electrolyte can be formed by adding an alcohol to a concentrate of the electrolyte whose water content is greatly reduced.

In this process, it is necessary to concentrate the aqueous dispersion liquid of the electrolyte at a temperature of 50° C. or less. The concentration temperature of the aqueous dispersion liquid of the electrolyte is preferably a temperature of 40° C. or less and more preferably a temperature of 30° C. or less. The concentration temperature of the aqueous dispersion liquid of the electrolyte is preferably a temperature which falls within a range of 0 to 40° C., more preferably a temperature which falls within a range of 0 to 30° C., even more preferably a temperature which falls within a range of 20 to 30° C. and particularly preferably a temperature of 25° C. By concentrating the aqueous dispersion liquid of the electrolyte at the aforementioned temperature, it is possible to substantially suppress the crystallization of the electrolyte carrying water molecules therein and to greatly reduce the water content in the resultant concentrate of the electrolyte.

In this process, it is necessary to reduce the water content in the concentrate of the electrolyte to 5% by mass or less based on the total mass of the concentrate of the electrolyte. The water content in the concentrate of the electrolyte is preferably in a range of 1 to 5% by mass based on the total mass of the concentrate of the electrolyte and more preferably in a range of 3 to 5% by mass based on the total mass of the concentrate of the electrolyte. Furthermore, the water content in the concentrate of the electrolyte may be determined by, for example, thermogravimetry (TG). By reducing the water content in the concentrate of the electrolyte to the aforementioned range, it is possible to stably form a dispersion liquid of a gelatinous electrolyte in the respective processes which will be described below.

In this process, it is preferred that the aqueous dispersion liquid of the electrolyte is concentrated until the electrolyte content in the concentrate of the electrolyte becomes 20% by mass or more based on the total mass of the concentrate of the electrolyte. The electrolyte content in the concentrate of the electrolyte is preferably in a range of 20 to 95% by mass based on the total mass of the concentrate of the electrolyte and more preferably in a range of 85 to 95% by mass based on the total mass of the concentrate of the electrolyte. Furthermore, the electrolyte content in the concentrate of the electrolyte may be determined by, for example, gas chromatography (GC) analysis. By concentrating the aqueous dispersion liquid of the electrolyte until the electrolyte content in the concentrate of the electrolyte falls within the aforementioned range, it is possible to greatly reduce the water content in the concentrate of the electrolyte.

In this process, it is preferred that the concentration of the aqueous dispersion liquid of the electrolyte is performed until the dielectric constant of the concentrate of the aqueous dispersion liquid of the electrolyte becomes 20 or less. Furthermore, the dielectric constant of the concentrate of the aqueous dispersion liquid of the electrolyte may be determined by using a dielectric constant measuring device or the like ordinarily used in the relevant technical field. By concentrating the aqueous dispersion liquid of the electrolyte until the dielectric constant of the concentrate of the electrolyte falls within the aforementioned range, it is possible to greatly reduce the water content in the concentrate of the electrolyte.

In this process, the concentration of the aqueous dispersion liquid of the electrolyte is performed under an atmospheric pressure or a reduced pressure. The pressure used in the concentration of the aqueous dispersion liquid of the electrolyte is preferably from an atmospheric pressure to a reduced pressure (namely, 101 kPa or less), more preferably in a rage of 70 to 101 kPa and even more preferably in a range of 80 to 95 kPa. By performing the concentration of the aqueous dispersion liquid of the electrolyte under the pressure which falls within the aforementioned range, it is possible to concentrate the aqueous dispersion liquid of the electrolyte at a predetermined temperature.

In this process, the concentration time of the aqueous dispersion liquid of the electrolyte is not particularly limited. The concentration of the aqueous dispersion liquid of the electrolyte is performed until the water content, optionally the electrolyte content, in the concentrate of the electrolyte described above becomes available.

[1-3: Cooling Process]

The method of the invention may optionally include a cooling process of cooling the concentrate of the electrolyte obtained in the water content reduction process. It is preferred that this process is performed in the case where the concentration temperature of the aqueous dispersion liquid of the electrolyte in the water content reduction process is equal to or higher than a room temperature, for example, higher than 30° C. By performing this process under the aforementioned conditions, it is possible to stably carry out the gelation of the electrolyte dispersion liquid.

In this process, the cooling temperature of the concentrate of the electrolyte is preferably a room temperature, more preferably a temperature which falls within a range of 10 to 30° C., even more preferably a temperature which falls within a range of 20 to 30° C. and particularly preferably a temperature of 25° C. By cooling the concentrate of the electrolyte to the aforementioned temperature, it is possible to stably carry out the gelation of the electrolyte dispersion liquid.

[1-4: Alcohol Addition Process]

This process is a process of adding an alcohol to the concentrate of the electrolyte obtained in the water content reduction process or the cooling process. By virtue of this process, it is possible to form a dispersion liquid of a gelatinous electrolyte.

The alcohol used in this process may be one or more alcohols having a dielectric constant of 24 or less, preferably one or more aliphatic alcohols and more preferably one or more lower aliphatic alcohols having a straight chain or a branched chain. The chain length of aliphatic groups of the lower aliphatic alcohols having the straight chain or the branched chain is preferably in a range of $C_1$ to $C_5$, more preferably in a range of $C_1$ to $C_4$ and even more preferably in a range of $C_1$ to $C_3$. The alcohol used in this process is preferably, for example, methanol, ethanol, propanol or a mixture thereof and more preferably ethanol. By using the alcohol, it is possible to stably carry out the gelation of the electrolyte dispersion liquid.

In this process, the addition amount of the alcohol may be appropriately set based on the kind of the electrolyte used, the water content in the concentrate of the electrolyte and/or the electrolyte content in the concentrate of the electrolyte. The addition amount of the alcohol is preferably set in such an amount that the electrolyte content in the aqueous dispersion liquid of the electrolyte available after the alcohol addition becomes substantially equal to the electrolyte content in the aqueous dispersion liquid of the electrolyte available before the water content reduction process. By adding the alcohol in the aforementioned amount, it is possible to stably carry out the gelation of the electrolyte dispersion liquid.

In this process, the temperature at which the alcohol is added to the concentrate of the electrolyte is preferably equal to the temperature of the water content reduction process or the cooling process. By performing this process at the aforementioned temperature, it is possible to stably carry out the gelation of the electrolyte dispersion liquid.

In this process, the pressure at which the alcohol is added to the concentrate of the electrolyte is not particularly limited. This process may be performed under an atmospheric pressure or a reduced pressure.

[1-5: Stirring Process]

The method of the invention may optionally include a stirring process of stirring the concentrate of the electrolyte to which the alcohol is added. By virtue of this process, it is possible to promote the gelation of the electrolyte dispersion liquid and to form a dispersion liquid of a gelatinous electrolyte.

In this process, the means for stirring the concentrate of the electrolyte is not particularly limited. It may be possible to use means ordinarily used in the relevant technical field, such as a mechanical stirrer, a magnetic stirrer or the like.

In this process, the temperature at which the electrolyte concentrate is stirred after the alcohol addition is preferably equal to the temperature of the alcohol addition process. By performing this process at the aforementioned temperature, it is possible to promote the gelation of the electrolyte dispersion liquid and to form a dispersion liquid of a gelatinous electrolyte.

In this process, the stirring time of the concentrate of the electrolyte is not particularly limited. The stirring may be continuously performed over the time period during which the gelation of the electrolyte dispersion liquid is substantially completed. The time point at which the gelation of the electrolyte dispersion liquid is substantially completed may be determined by confirming the gel state of the electrolyte dispersion liquid based on the criteria described above.

As described above, the use of the method of the invention makes it possible to easily produce a dispersion liquid of a gelatinous electrolyte. In the case where the dispersion liquid of the gelatinous electrolyte produced by the method of the invention is used as, for example, a material of a solid polymer electrolyte membrane used in a membrane electrode assembly of a fuel cell, it is possible to directly bond a catalyst layer to an upper surface and/or a lower surface of a solid polymer electrolyte membrane without having to use an auxiliary material. Thus, the method of the invention is useful in producing a material of a solid polymer electrolyte membrane used in a membrane electrode assembly of a fuel cell.

EXAMPLE

Hereinafter, the invention will be described in more detail using examples. However, the technical scope of the invention is not limited to these examples.

Experiment I: Production of Gelatinous Electrolyte Dispersion Liquid

An aqueous dispersion liquid of an electrolyte composed of 20% by mass of a Nafion (registered trademark) dispersion liquid of DE2021CS type and 10% by mass of a Nafion (registered trademark) dispersion liquid of DE1021CS type (both manufactured by Wako Pure Chemical Industries, Ltd.) was heated and concentrated at a reduced pressure (pressure: 91 kPa) under the following conditions through the use of a drying furnace, thereby preparing a concentrate of an electrolyte. The water content and the electrolyte (Nafion) content in the concentrate of the electrolyte were measured by thermogravimetry (TG) and gas chromatography (GC) analysis. The concentrate concentrated to predetermined water content was taken out from the drying furnace and was sufficiently cooled to a room temperature. Ethanol was added to the cooled electrolyte concentrate. Subsequently, the ethanol-added concentrate was stirred for 15 minutes using a rotation-revolution mixer (Awatori Rentaro, AR-100) manufactured by THINKY corporation. The addition amount of ethanol in this process was determined by calculating the amount required for the post-addition electrolyte content of the electrolyte dispersion liquid to become equal to the pre-addition electrolyte content of the electrolyte dispersion liquid. The post-stirring state of the dispersion liquid of the electrolyte was checked by naked eyes. The results are shown in the following table.

TABLE 1

| Water content in concentrate (% by mass) | Concentration temperature (° C.) | Electrolyte content in concentrate (% by mass) | Gelation |
|---|---|---|---|
| 3 | 100 | 97 | X |
|   | 80 | 97 | X |
|   | 50 | 94 | Δ |
|   | 40 | 94 | ○ |
|   | 30 | 92 | ○ |
|   | 25 | 92 | ○ |
|   | 5 | 92 | ○ |
| 5 | 100 | 95 | X |
|   | 80 | 95 | X |
|   | 50 | 92 | Δ |

TABLE 1-continued

| Water content in concentrate (% by mass) | Concentration temperature (° C.) | Electrolyte content in concentrate (% by mass) | Gelation[X] |
|---|---|---|---|
|  | 40 | 92 | ○ |
|  | 30 | 90 | ○ |
|  | 25 | 90 | ○ |
|  | 5 | 90 | ○ |
| 7 | 100 | 93 | X |
|  | 80 | 93 | X |
|  | 50 | 90 | Δ |
|  | 40 | 90 | ○ |
|  | 30 | 88 | ○ |
|  | 25 | 88 | ○ |
|  | 5 | 88 | ○ |
| 10 | 100 | 90 | X |
|  | 80 | 90 | X |
|  | 50 | 87 | Δ |
|  | 40 | 87 | ○ |
|  | 30 | 85 | ○ |
|  | 25 | 85 | ○ |
|  | 5 | 85 | ○ |

[X]Evaluation of gelation
○: State capable of being pinched and held
Δ: State incapable of being pinched and held while showing an increase in viscosity
X: State showing no change As shown in Table 1, if the aqueous dispersion liquid of the electrolyte is concentrated at a temperature of 5, 25, 30, 40 or 50° C. and if the water content in the aqueous dispersion liquid of the electrolyte is reduced to 3 or 5% by mass based on the total mass of the aqueous dispersion liquid, the state of the electrolyte dispersion liquid after the ethanol addition became a gel state. That is to say, it was confirmed that the dispersion liquid including the electrolyte concentrate and ethanol becomes a cohesive dispersion system and further that the mixed state of the electrolyte concentrate and ethanol continuously spreads over the entirety of the electrolyte dispersion liquid and shows a mechanical behavior having a solid feature.

Experiment II: Production Example Using Other Electrolytes

A dispersion liquid of an electrolyte was prepared by the same procedures as those of experiment I except that Flemion (registered trademark) (manufactured by Asahi Glass Co., Ltd.) and Aciplex (trademark) (manufactured by Asahi Glass Co., Ltd.) are used as the electrolyte. The state of the dispersion liquid was evaluated by the same procedures as those of experiment I. It was made clear that even when these electrolytes are used, a dispersion liquid of a gelatinous electrolyte is obtained under the same conditions.

A dispersion liquid of an electrolyte was prepared by the same procedures as those of experiment I except that the high-oxygen-permeability electrolyte disclosed in JP 2011-140605 A is used as the electrolyte. The state of the dispersion liquid was evaluated by the same procedures as those of experiment I. It was made clear that even when this electrolyte is used, a dispersion liquid of a gelatinous electrolyte is obtained under the same conditions.

What is claimed is:

1. A producing method of producing a dispersion liquid of a gelatinous electrolyte, comprising:
    a water content reduction process of concentrating an aqueous dispersion liquid of an electrolyte at a temperature from 5° C. to 40° C. and reducing a water content in a concentrate of the electrolyte to 3% to 5% by mass based on a total mass of the concentrate of the electrolyte; and
    an alcohol addition process of adding an alcohol to the concentrate of the electrolyte obtained in the water content reduction process to form the dispersion liquid of the gelatinous electrolyte.

2. The producing method according to claim 1, wherein in the water content reduction process, the aqueous dispersion liquid of the electrolyte is concentrated until an electrolyte content in the concentrate of the electrolyte becomes 20% by mass or more based on the total mass of the concentrate of the electrolyte.

3. The producing method according to claim 1, wherein in the water content reduction process, the aqueous dispersion liquid of the electrolyte is concentrated at a temperature which falls within a range 5° C. to 30° C.

4. The producing method according to claim 1, wherein the alcohol is one or more aliphatic alcohols.

5. The producing method according to claim 1, further comprising a cooling process of cooling the concentrate of the electrolyte obtained in the water content reduction process.

6. The producing method according to claim 1, wherein the concentration of the aqueous dispersion liquid of the electrolyte is performed until a dielectric constant of the concentrate of the aqueous dispersion liquid of the electrolyte becomes 20 or less.

7. The producing method according to claim 1, wherein the concentration of the aqueous dispersion liquid of the electrolyte is performed under an atmospheric pressure or a reduced pressure.

8. The producing method according to claim 1, wherein an addition amount of the alcohol is set in such an amount that the electrolyte content in the aqueous dispersion liquid of the electrolyte available after the alcohol addition becomes substantially equal to the electrolyte content in the aqueous dispersion liquid of the electrolyte available before the water content reduction process.

9. The producing method according to claim 1, further comprising a stirring process of stirring the concentrate of the electrolyte to which the alcohol is added.

10. The producing method according to claim 9, wherein a temperature at which the electrolyte concentrate is stirred after the alcohol addition is equal to a temperature of the alcohol addition process.

* * * * *